(12) United States Patent
Riehl et al.

(10) Patent No.: US 11,934,524 B2
(45) Date of Patent: Mar. 19, 2024

(54) SECURE FINGERPRINT IMAGE SYSTEM

(71) Applicant: Analog Devices, Inc., Norwood, MA (US)

(72) Inventors: Patrick Riehl, Lynnfield, MA (US); Tze Lei Poo, Cambridge, MA (US)

(73) Assignee: Analog Devices, Inc., Norwood, MA (US)

( * ) Notice: Subject to any disclaimer, the term of this patent is extended or adjusted under 35 U.S.C. 154(b) by 791 days.

(21) Appl. No.: 16/906,639

(22) Filed: Jun. 19, 2020

(65) Prior Publication Data

US 2020/0401699 A1 Dec. 24, 2020

Related U.S. Application Data

(60) Provisional application No. 62/864,879, filed on Jun. 21, 2019.

(51) Int. Cl.
| | |
|---|---|
| *G06F 21/62* | (2013.01) |
| *G06F 21/57* | (2013.01) |
| *G06F 21/83* | (2013.01) |
| *G06F 21/10* | (2013.01) |

(52) U.S. Cl.
CPC .......... *G06F 21/57* (2013.01); *G06F 21/6209* (2013.01); *G06F 21/6245* (2013.01); *G06F 21/83* (2013.01); *G06F 21/1064* (2023.08); *G06F 21/107* (2023.08); *G06F 2221/031* (2013.01); *G06F 2221/2149* (2013.01)

(58) Field of Classification Search
CPC .. G06F 21/57; G06F 21/6209; G06F 21/6245; G06F 21/83; G06F 21/85; G06F 2221/031; G06F 2221/0735; G06F 2221/0751; G06F 2221/2149; H04L 9/0861; H04L 9/0877; H04L 9/3278
See application file for complete search history.

(56) References Cited

U.S. PATENT DOCUMENTS

| | | | |
|---|---|---|---|
| 7,065,654 B1 * | 6/2006 | Gulick | G06F 21/85 |
| | | | 713/193 |
| 7,200,549 B1 | 4/2007 | Fujii et al. | |
| 2010/0138667 A1 | 6/2010 | Adams et al. | |
| 2017/0061108 A1 * | 3/2017 | Kwon | G06F 3/0416 |
| 2017/0110396 A1 * | 4/2017 | Cronin | H01L 23/53228 |
| 2019/0042756 A1 * | 2/2019 | Lal | H04L 9/3234 |
| 2019/0165956 A1 * | 5/2019 | Adham | H04L 9/0838 |

* cited by examiner

*Primary Examiner* — Minh Dinh
(74) *Attorney, Agent, or Firm* — ArentFox Schiff LLP

(57) ABSTRACT

Herein disclosed are approaches for protecting sensitive information within a fingerprint authentication system that can be snooped and utilized to access the device, secured information, or a secured application. The approaches can utilize encryption keys and hash functions that are unique to the device in which the fingerprint authentication is being performed to protect the sensitive information that can be snooped.

9 Claims, 8 Drawing Sheets

SECURE FINGERPRINT IMAGE SYSTEM

RELATED APPLICATIONS

The present disclosure claims priority to U.S. provisional application No. 62/864,879 entitled "SECURE FINGERPRINT IMAGE SYSTEM" and filed Jun. 21, 2019, the disclosure of which is incorporated by reference in its entirety.

FIELD OF THE DISCLOSURE

This disclosure relates in general to the field of computing, and more particularly, though not exclusively, to a system and method for securing user fingerprint data for fingerprint authentication.

BACKGROUND

Fingerprint authentication has developed as an approach for accessing secured devices, secured information, and/or secured applications. In particular, a device can include a fingerprint scanner that can capture a fingerprint of a finger placed on a display of the fingerprint scanner. The device compares the captured fingerprint to a stored, known fingerprint for a user to determine whether the captured fingerprint matches the known fingerprint. Based on the determination of whether the fingerprints match, the device may allow or prevent access to the device, secured information stored on the device, and/or secured applications that can be executed via the device.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

SUMMARY OF THE DISCLOSURE

Figure 1:
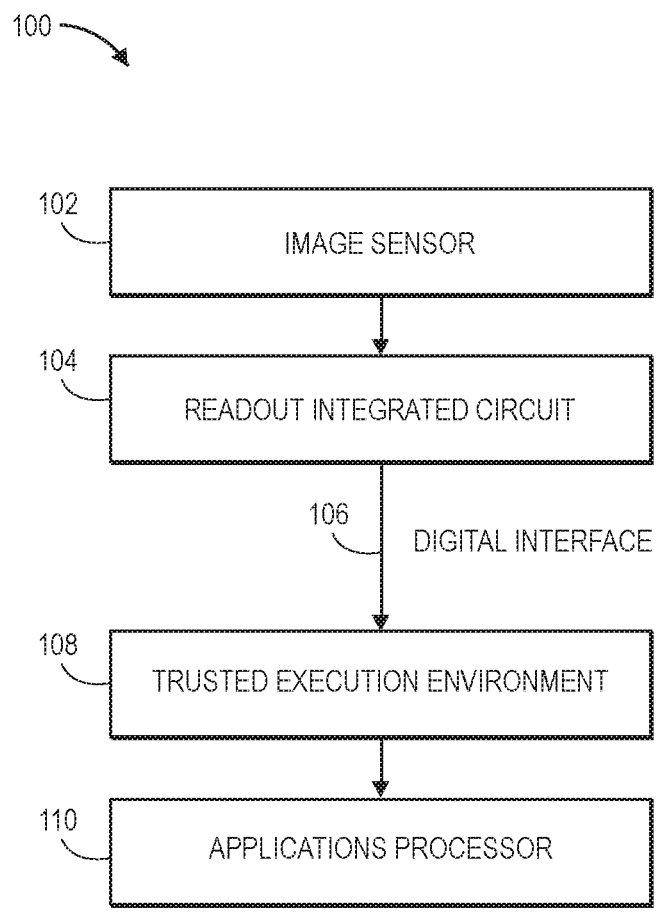
FIG. 1 illustrates a block diagram of a fingerprint authentication system according to various embodiments.

Herein disclosed are approaches for protecting sensitive information within a fingerprint authentication system that can be snooped and utilized to access the device, secured information, or a secured application. The approaches can utilize encryption keys and hash functions that are unique to the device in which the fingerprint authentication is being performed to protect the sensitive information that can be snooped.

In some embodiments, a device that is to implement fingerprint authentication may include an image sensor and a readout integrated circuit (ROIC). The image sensor may capture an image of a fingerprint of a user for the fingerprint authentication. The ROIC may be coupled to the image sensor, the ROIC may utilize an encryption key or a hash function to perform encryption or hashing of the image, wherein the encryption key or the hash function is unique to the device.

In some embodiments, one or more computer-readable media may have instructions stored thereon, wherein the instructions, when executed by a device, can cause the device to capture an image of a fingerprint and encrypt or hash the image to produce an encrypted image or a hashed image, wherein an encryption key or a hash function utilized to encrypt or hash the image is unique to the device. The instructions may further cause the device to provide the encrypted image or the hashed image for fingerprint authentication.

In some embodiments, a device for fingerprint authentication may include a trusted execution environment (TEE) and a readout integrated circuit (ROIC). The TEE may determine a result of the fingerprint authentication. The ROIC may generate an encryption key or a hash function, the encryption key or the hash function being unique to the device, and provide the encryption key or a hashed image of a fingerprint produced by the hash function to the TEE via an interface, the encryption key or the hashed image to be utilized for the fingerprint authentication.

DETAILED DESCRIPTION

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples, or in some cases across different figures. This repetition is for the purpose of simplicity and clarity and does not in itself dictate a specific relationship between the various embodiments and/or configurations discussed. Different embodiments may have different advantages, and no particular advantage is necessarily required of any embodiment.

Embodiments disclosed herein may secure a vulnerability commonly presented in fingerprint authentication systems. For example, a fingerprint authentication system can include a digital interface between a component of the system that converts an analog representation of a captured fingerprint to a digital representation of the captured fingerprint and another component of the system that determines whether the captured fingerprint matches a control fingerprint. This digital interface can be vulnerable to snooping attacks by a third party (such as hacker), where the third party can see and capture the data being transmitted via the digital interface including the digital representation of the captured fingerprint.

The embodiments disclosed herein may encrypt and/or hash the digital representation of the fingerprint that is transmitted via the digital interface. Further, the encryption key utilized for encryption and a hash function utilized for hashing of the digital representation are unique to the device, such that any digital representation of the fingerprint being transmitted via the digital interface that may be snooped may be useless or may have limited use. In particular, it may be impossible for a third party to recreate the fingerprint from the snooped, encrypted and/or hashed digital representation of the fingerprint.

A system and method for encrypting and/or hashing a digital representation of a fingerprint to be transmitted via a digital interface will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

Base System

A smartphone or similar device may use optical fingerprint-on-display technology for user authentication, to unlock the device or to access sensitive information such as an online banking application. It can be beneficial to secure the fingerprint image data, not only to prevent unauthorized access to the device in question, but also to prevent the fingerprint data from being used maliciously in other contexts.

A fingerprint authentication system may include an image sensor, a readout integrated circuit (ROIC), a trusted execution environment (TEE), and an applications processor (AP). The image sensor captures an image of a fingerprint using a photodiode array. The ROIC converts this signal into a digital representation of the fingerprint image. The TEE can provide a secure environment wherein the fingerprint image is compared to a control image for the purpose of authentication. The TEE provides a binary result to the AP indicating whether the fingerprint image matched the control image.

The systems and method disclosed herein concern the security of the interface between the ROIC and the TEE. If this interface is compromised, an attacker could gain access to the valuable fingerprint data and use it on the device in question or anywhere that fingerprint authentication is used.

FIG. 1 illustrates a block diagram of a fingerprint authentication system 100 according to various embodiments. The fingerprint authentication system 100 may capture an image of a fingerprint and utilize the image to authenticate a user based on the fingerprint. The fingerprint authentication system 100 may allow access to a device implementing the fingerprint authentication system 100, secured information, and/or secured applications based on the user being positively authenticated.

The fingerprint authentication system 100 includes an image sensor 102. The image sensor 102 may capture an image of a fingerprint from a finger of a user placed on the image sensor 102. The image sensor 102 may direct light at the finger and sense reflected light to produce the image of the fingerprint. In some embodiments, the image sensor 102 may comprise a display with one or more thin-film transistor sensors, where the display may emit light directed at a finger placed on the display and the thin-film transistor sensors may detect the reflected light. Further, the image sensor 102 may include a photodiode array to facilitate capture of the image. The image sensor 102 may output an analog representation of the captured image (which may be referred to as an "analog image" of the fingerprint).

The fingerprint authentication system 100 further includes an ROIC 104. The ROIC 104 can receive the analog image of the fingerprint from the image sensor 102 and may perform one or more operations with the analog image, as described further throughout this disclosure. In particular, the ROIC 104 can convert the analog image into a digital representation of the image of the fingerprint (which may be referred to as a "digital image" of the fingerprint). Further, the ROIC 104 may encrypt and/or perform a hash operation on the digital image. The ROIC 104 may provide the encrypted and/or hashed digital image to a digital interface 106, where the digital interface 106 may be vulnerable to snooping. Due to the digital image being encrypted and/or hashed, any snooped information obtained from the digital interface 106 may be prevented from being used to reproduce an unencrypted and unhashed image of the fingerprint originally captured. Without the unencrypted and unhashed image of the fingerprint, the third party that snooped the information may be prevented from accessing the device, accessing secured information, and/or accessing secured applications through use of the fingerprint of the user.

For the encryption of the digital image, the encryption performed by the ROIC 104 may be based on a unique encryption key, where the encryption key is unique to the device that implements the fingerprint authentication system 100. In some embodiments, the unique encryption key may be generated via a physically uncloneable function (PUF), where the PUF may be implemented by a circuit that generates a random code for an integrated circuit implementing the fingerprint authentication system 100.

For the performance of the hash operation, a hash function applied during the hash operation performed by the ROIC 104 may comprise a unique hash function, where the hash function is unique to the device that implements the fingerprint authentication system 100. In some embodiments, the unique hash function may be based on a random code generated by a PUF, where the PUF may be implemented by a circuit that generates a random code for an integrated circuit implementing the fingerprint authentication system 100.

The fingerprint authentication system 100 further includes a TEE 108. The TEE 108 may receive the encrypted and/or hashed digital image transmitted via the digital interface 106. In some embodiments, the TEE 108 may decrypt the digital image and compare the decrypted digital image to a control image to determine whether the digital image and the control image substantially match (i.e., either exactly match or match within a predefined difference measurement range). The control image may be an image of a fingerprint of an authorized user that was previously captured. The decryption of the digital image may be performed using the unique encryption key, which may have been previously provided to the TEE 108 via the ROIC 104. The TEE 108 may output an indication (such as binary values or analog values) of whether the digital image and the control image substantially match.

In other embodiments, the TEE 108 may compare the encrypted and/or hashed digital image to a control image to determine whether the encrypted and/or hashed digital image substantially matches (i.e., either exactly matches or matches within a predefined difference measurement range) the control image. In these embodiments, the control image may comprise an encrypted and/or hashed image of a fingerprint of an authorized user that was previously captured. In particular, the unique encryption key may have been utilized to encrypt and/or the unique hash function may have been utilized to hash the previously captured fingerprint of the authorized user to produce the control image. The TEE 108 may output an indication (such as binary values or analog values) of whether the encrypted and/or hashed digital image and the control image substantially match.

The fingerprint authentication system 100 further includes an AP 110. The AP 110 may receive the indication from the TEE 108. Further, the AP 110 may allow or prevent access to the device, access to secured information, and/or access to secured applications based on the indication. In particular, if the indication indicates that the digital image, or the encrypted and/or hashed digital image, substantially matches the control image, the AP 110 can allow access to the device, the secured information, and/or the secured applications. If the indication indicates that the digital image, or the encrypted and/or hashed digital image, does not substantially match the control image, the AP 110 can prevent access to the device, the secured information, and/or the secured applications.

Encryption Approach

After scanning the fingerprint, the ROIC transmits the image using a digital interface to a TEE, where the image is compared to a control image. If an attacker could listen in to the ROIC-TEE interface, the image data could be acquired maliciously. This could happen if the attacker was able to modify software to access this data interface, or by physically tapping into the data lines.

An approach to prevent unauthorized access to fingerprint data is to use encryption. If the ROIC and TEE share a unique encryption key, the fingerprint image can be encrypted before transmission via the ROIC-TEE interface. It can then be decrypted inside the TEE and authentication can be performed as usual. If an attacker is able to listen in to the interface, the encrypted image will be of no value without the key.

This approach includes a secure way to exchange the encryption key. It cannot be done when the device is powered up because this would allow an attacker to obtain the key and defeat the security. So, the encryption key may be exchanged at factory setup and may not be exchanged after. After the encryption key is exchanged at factory setup, a fuse can be blown or some other irreversible process executed to prevent the encryption key from being exposed again.

Each ROIC may use a unique encryption key. This can be generated using a PUF, a circuit that generates a random code for integrated circuits that share the same design.

Figure 2:
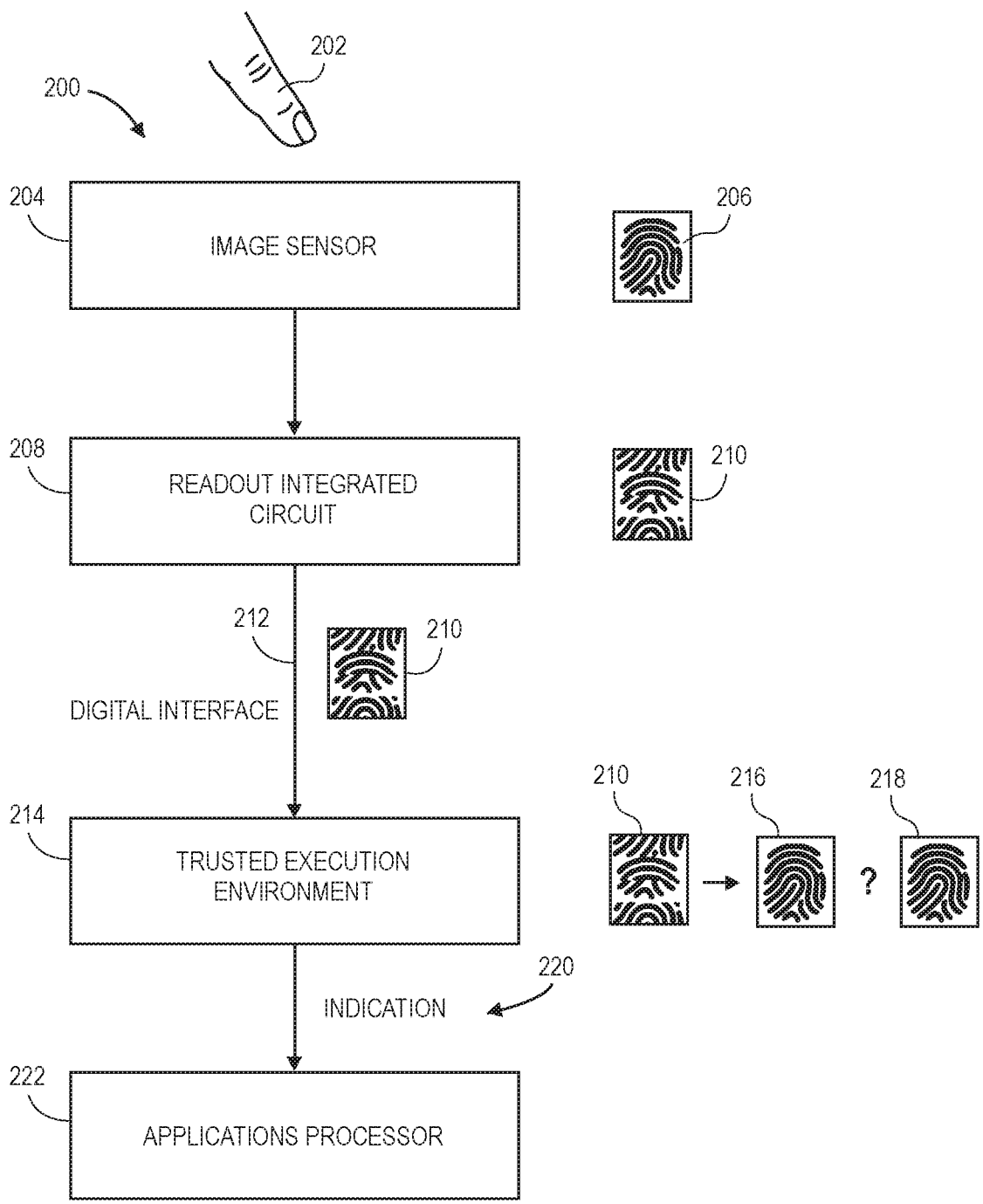
FIG. 2 illustrates an example data flow for an example fingerprint authentication system according to various embodiments.

FIG. 2 illustrates an example data flow for an example fingerprint authentication system 200 according to various embodiments. The fingerprint authentication system 200 may include one or more of the features of the fingerprint authentication system 100 (FIG. 1). For example, the components of the fingerprint authentication system 200 may include one or more of the features of the corresponding components of the fingerprint authentication system 100. The fingerprint authentication system 200 may implement an example encryption approach in accordance with some embodiments disclosed herein.

A finger 202 of a user may be placed on a portion of an image sensor 204 of the fingerprint authentication system 200 to initiate fingerprint authorization procedure. For example, the finger 202 may be placed on a display of the image sensor 204, where the display emits light and detects light reflected back by the finger. Based on the light reflected back by the finger, the image sensor 204 generates an analog image 206 of a fingerprint of the finger. The image sensor 204 outputs the analog image 206 to a ROIC 208 of the fingerprint authentication system 200.

The ROIC 208 receives the analog image 206 of the fingerprint from the image sensor 204 and converts the analog image 206 to a digital image. Further, the ROIC 208 encrypts the digital image to produce an encrypted digital image 210. The ROIC 208 utilizes a unique encryption key to encrypt the digital image, where the unique encryption key is unique to the device that implements the fingerprint authentication system 200. The ROIC 208 may include an encryption key generator that generates the unique encryption key. The encryption key generator may utilize a PUF to generate the unique encryption key. The ROIC 208 may provide the encrypted digital image 210 to a digital interface 212 of the fingerprint authentication system 200.

A TEE 214 of the fingerprint authentication system 200 may receive the encrypted digital image 210 from the digital interface 212. The TEE 214 can decrypt the encrypted digital image 210 to produce a digital image 216 of the fingerprint. The TEE 214 may utilize the unique encryption key generated by the ROIC 208 to decrypt the encrypted digital image 210, where the ROIC 208 may have previously provided the unique encryption key to the TEE 214. The TEE 214 may compare the digital image 216 with a control image 218 of a fingerprint for an authorized user. Based on the comparison, the TEE 214 may determine whether the digital image 216 substantially matches (i.e., either exactly matches or matches within a predefined difference measurement range) the control image 218. The TEE 214 may output an indication 220 (such as binary values or analog values) of whether the digital image 216 substantially matches the control image 218.

An AP 222 of the fingerprint authentication system 200 may receive the indication 220. Based on the indication 220, the AP 222 may grant or prevent access to the device, secured information, and/or secured applications. In particular, the AP 222 may grant access to the device, secured information, and/or secured applications in response to determining that the indication 220 indicates that the digital image 216 and the control image 218 substantially match. The AP 222 may prevent access to the device, secured information, and/or secured applications in response to determining that the indication 220 indicates that the digital image 216 and the control image 218 do not substantially match.

Figure 3:
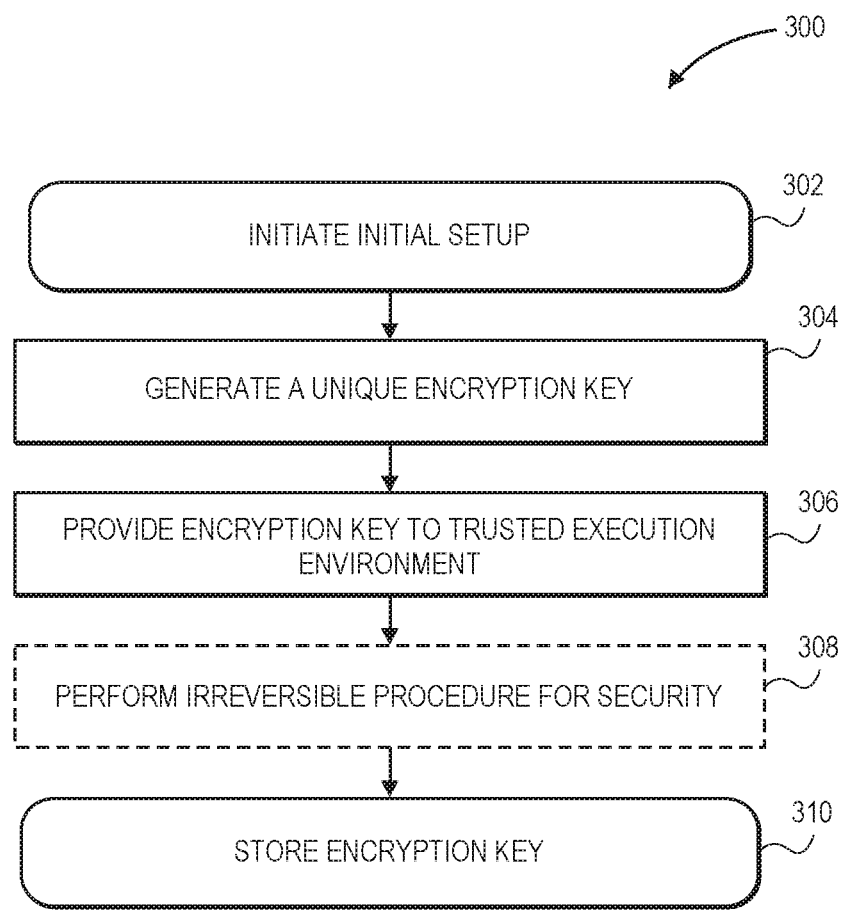
FIG. 3 illustrates an example procedure for setup of the fingerprint authentication system according to various embodiments.

FIG. 3 illustrates an example procedure 300 for setup of the fingerprint authentication system (such as the fingerprint authentication system 200 (FIG. 2)) according to various embodiments. In particular, the procedure 300 may be performed by the fingerprint authentication system to generate a unique encryption key and provide the unique encryption key to components of the fingerprint authentication system that utilize the encryption key.

The procedure 300 may initiate with 302, where an initial setup of the fingerprint authentication system is initiated. The initial setup may be performed at factory setup of the fingerprint authentication system. In some embodiments, the initial setup may be prevented from occurring again after completion of the factory setup. The procedure 300 may proceed from 302 to 304.

In 304, a unique encryption key is generated. In particular, an ROIC (such as the ROIC 208 (FIG. 2)) may generate the unique encryption key and may store the unique encryption key for use in encryption. The unique encryption key may have been generated using a chip-unique code, where the chip-unique code may have been generated via a PUF in some embodiments. The procedure 300 may proceed from 304 to 306.

In 306, the unique encryption key is provided to a TEE (such as the TEE 214 (FIG. 2)) of the fingerprint authentication system. In particular, the ROIC may provide the unique encryption key to an interface between the ROIC and the TEE to provide the unique encryption key to the TEE. In some embodiments, the interface may comprise a digital interface (such as the digital interface 212 (FIG. 2)) between the ROIC and the TEE. In other embodiments, the interface may comprise another interface between the ROIC and the TEE separate from the digital interface. The procedure 300 may proceed from 306 to 308. In embodiments where 308 is omitted, the procedure 300 may proceed from 306 to 310.

In 308, an irreversible procedure may be performed for security of the unique encryption key. The irreversible procedure may include performing a procedure that prevents the ROIC from subsequently providing the unique encryption key to the interface. In some embodiments, the ROIC may include a fuse that can decouple an output of the ROIC from which the unique encryption key may be transmitted from the interface. For example, the ROIC may include an encryption key generator in some embodiments, where the fuse is coupled between the encryption key generator and the interface. The fuse may be blown, where the fuse prevents the unique encryption key from being provided to the interface when blown. In some embodiments, 308 may be omitted. The procedure 300 may proceed from 308 to 310.

In 310, the unique encryption key is stored by the TEE. In particular, the TEE receives the unique encryption key via the digital interface and stores the encryption in a memory of the TEE. In some embodiments, the unique encryption key may be stored in a secure, non-volatile memory of the TEE. The procedure 300 concludes with 310.

While a certain order of operations is described for the illustrated embodiment of the procedure 300, it should be understood that the order of the operations may differ in other embodiments. Further, one or more of the operations of the procedure 300 may be performed concurrently.

Figure 4:
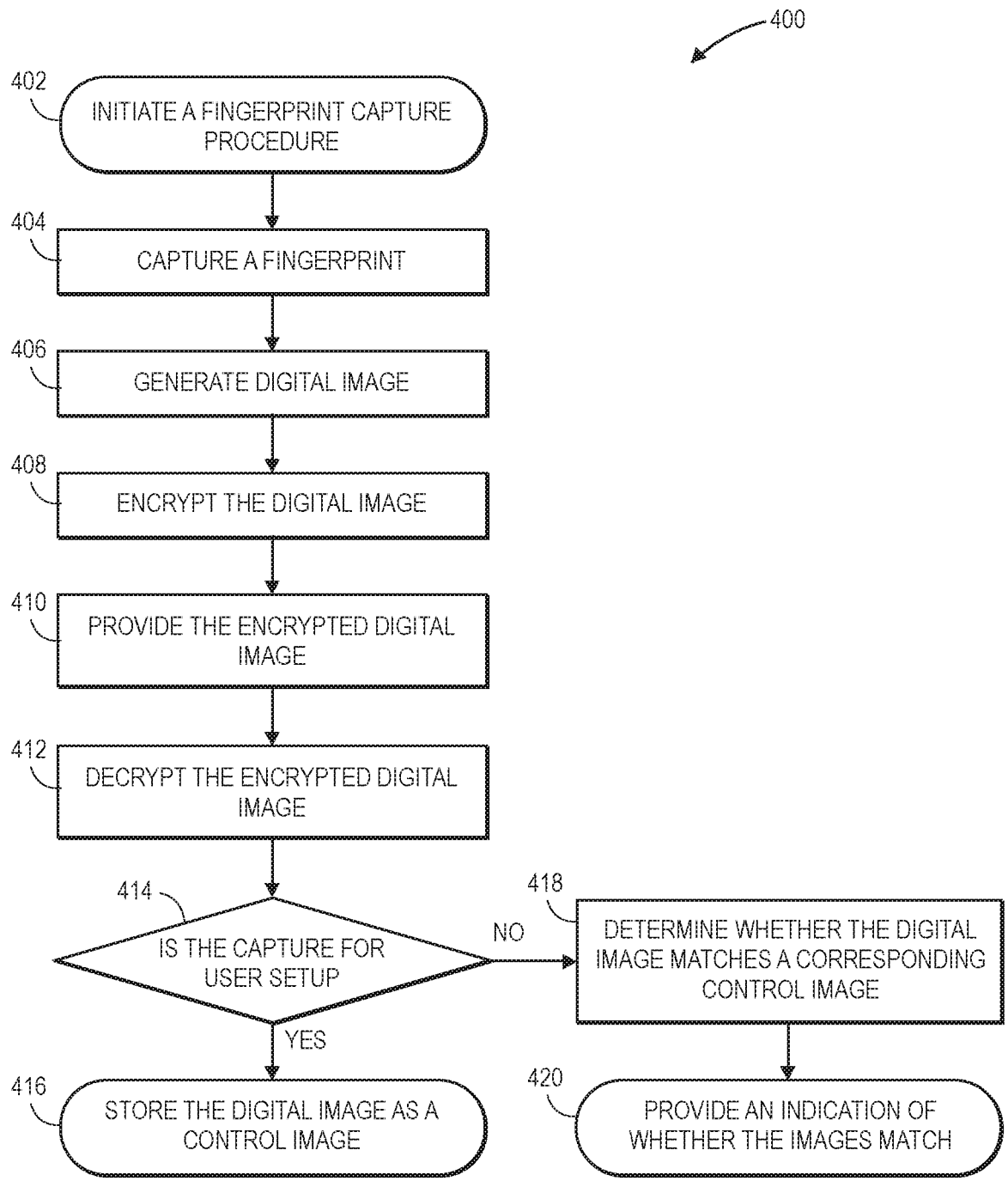
FIG. 4 illustrates an example procedure of fingerprint capture to be implemented by a fingerprint authentication system according to various embodiments.

FIG. 4 illustrates an example procedure 400 of fingerprint capture to be implemented by a fingerprint authentication system (such as the fingerprint authentication system 200 (FIG. 2)) according to various embodiments. The procedure 400 can be utilized for user authentication via a fingerprint or generation of a control image depending if the procedure 400 is being performed as part of a user setup. The procedure 400 may be performed after the procedure 300 has been performed for the fingerprint authentication system to initialize the fingerprint authentication system.

The procedure 400 initiates with 402, where a fingerprint capture procedure is initiated. A user placing a finger on an image sensor (such as the image sensor 204 (FIG. 2)) may cause 402 to be initiated. The procedure 400 may proceed from 402 to 404.

In 404, a fingerprint of the finger is captured. In particular, the image sensor may direct light at the finger and detect light reflected back from the finger. Based on the light reflected back, the image sensor may generate an analog image of the fingerprint. The procedure 400 may proceed from 404 to 406.

In 406, a digital image of the fingerprint is generated from the analog image. In particular, an ROIC (such as the ROIC 208 (FIG. 2)) of the fingerprint authentication system may receive the analog image. The ROIC may convert the received analog image to the digital image. The procedure 400 may proceed from 406 to 408.

In 408, the digital image is encrypted to produce an encrypted digital image. In particular, the ROIC may utilize a unique encryption key to encrypt the digital image and produce the encrypted digital image. The ROIC may utilize the unique encryption key generated in 304 (FIG. 3) to encrypt the digital image. The procedure 400 may proceed from 408 to 410.

In 410, the ROIC provides the encrypted digital image to a TEE (such as the TEE 214 (FIG. 2)) of the fingerprint authentication system. In particular, the ROIC may provide the encrypted digital image to a digital interface between the ROIC and the TEE. The TEE may receive the encrypted digital image from the digital interface. The procedure 400 may proceed from 410 to 412.

In 412, the encrypted digital image is decrypted. In particular, the TEE decrypts the encrypted digital image to produce a digital image of the fingerprint. The TEE may utilize the unique encryption key stored in 310 (FIG. 3) to decrypt the encrypted digital image. The procedure 400 may proceed from 412 to 414.

In 414, the procedure 400 may proceed differently dependent on whether the fingerprint capture procedure is being performed as part of a user setup. In some embodiments, the TEE may determine whether the fingerprint capture procedure is being performed as part of a user setup and may determine how to proceed based on whether the fingerprint capture procedure is being performed as part of a user setup. If the fingerprint capture procedure is being performed as part of a user setup, the procedure 400 proceeds to 416. If the fingerprint capture procedure is not being performed as part of a user setup, the procedure 400 proceeds to 418.

In 416, the digital image is stored as a control image for the user that is subject of the user setup. The control image may be stored by the TEE and the TEE may utilize the control image for subsequent authentications of the user. The procedure 400 may conclude with 416 when user setup is being performed.

In 418, whether the digital image substantially matches (i.e., either exactly match or match within a predefined difference measurement range) a corresponding control image may be determined. In particular, the digital image may be compared with a control image of a fingerprint for a user for which authentication is being performed. The TEE may perform the comparison and determine whether the digital image substantially matches the control image. The procedure 400 may proceed from 418 to 420.

In 420, an indication of whether the digital image and the control images substantially match may be provided. In particular, the TEE may generate an indication indicating whether the digital image and the control image substantially match. The TEE may provide the indication to an AP (such as the AP 222 (FIG. 2)) of the fingerprint authentication system. The AP may utilize the indication to determine whether access should be provided to the device, secured information, and/or secured applications.

Figure 5:
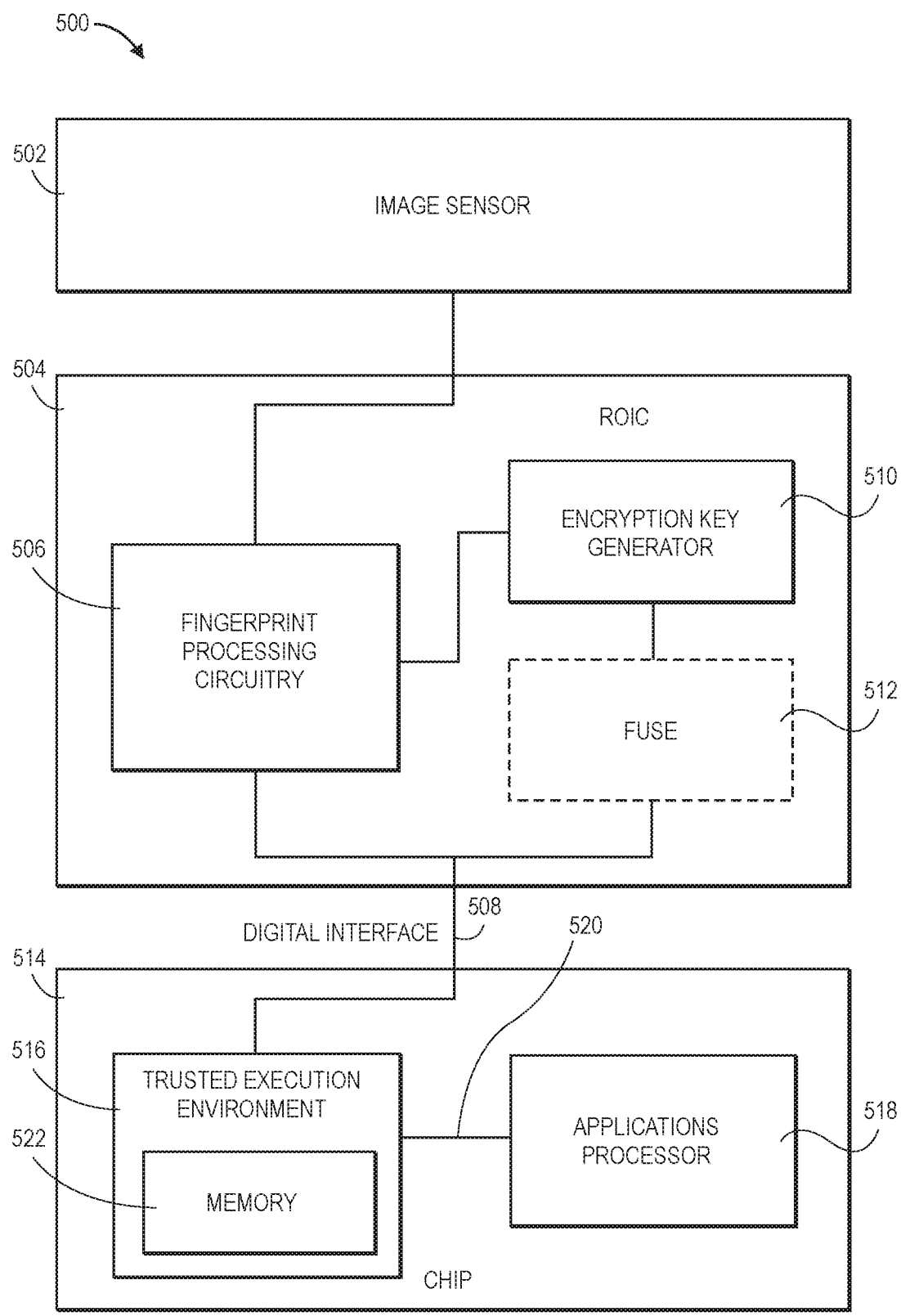
FIG. 5 illustrates a block diagram of fingerprint authentication system according to various embodiments.

FIG. 5 illustrates a block diagram of fingerprint authentication system 500 according to various embodiments. The fingerprint authentication system 500 may include one or more of the features of the fingerprint authentication system 100 (FIG. 1) and/or the fingerprint authentication system 200 (FIG. 2). The fingerprint authentication system 500 may implement the procedure 300 (FIG. 3) and/or the procedure 400 (FIG. 4).

The fingerprint authentication system 500 includes an image sensor 502. The image sensor 502 may include one or more of the features of the image sensor 102 (FIG. 1) and/or the image sensor 204 (FIG. 2). The image sensor 502 may capture an image of a fingerprint of a finger placed on a portion (such as a display) of the image sensor 502 and may generate an analog image of the fingerprint.

The fingerprint authentication system 500 further includes an ROIC 504 coupled to the image sensor 502. The ROIC 504 may receive the analog image from the image sensor 502, convert the analog image to a digital image, and encrypt the digital image to produce an encrypted digital image. Further, the ROIC 504 may generate a unique encryption key.

The ROIC 504 includes fingerprint processing circuitry 506. The fingerprint processing circuitry 506 may receive the analog image from the image sensor 502. The fingerprint processing circuitry 506 may convert the analog image to a digital image, and may encrypt the digital image. The fingerprint processing circuitry 506 may encrypt the digital image using a unique encryption key, where the unique encryption key is unique to a device implementing the fingerprint authentication system 500. The fingerprint processing circuitry 506 may provide the encrypted digital image to a digital interface 508 of the fingerprint authentication system 500.

The ROIC 504 further includes an encryption key generator 510. The encryption key generator 510 may generate the unique encryption key utilized by the fingerprint processing circuitry 506 for encrypting the digital image. In some embodiments, the encryption key generator 510 may implement a PUF to generate the unique encryption key. The encryption key generator 510 may provide the unique encryption key to the fingerprint processing circuitry 506 for encrypting the digital image.

The ROIC 504 may further include a fuse 512 coupled between the encryption key generator 510 and the digital interface 508. The fuse 512 may couple the encryption key generator 510 to the digital interface 508 and may allow the encryption key generator 510 to provide the unique encryption key to the digital interface 508. After initial setup of the fingerprint authentication system 500, the fuse 512 may be blown, thereby decoupling the connection between the encryption key generator 510 and the digital interface 508. When the fuse 512 is blown, the encryption key generator 510 may be prohibited from providing the unique encryption key to the digital interface 508. In other embodiments, the fuse 512 may be omitted. In these embodiments, the encryption key generator 510 may be directly coupled to the digital interface 508. While the encryption key generator is described as being coupled to the digital interface 508 (either directly or via the fuse 512) and providing the unique encryption key to the digital interface, it should be understood in other embodiments that another interface may be coupled in parallel to the digital interface 508 and the unique encryption key may be provided to the other interface.

The fingerprint authentication system 500 may further include a chip 514. The chip 514 may include a TEE 516 and an AP 518. The chip 514 may provide physical separation and/or a firewall between the TEE 516 and the AP 518 for security between the TEE 516 and the AP 518. The chip 514 may further provide a secure interface 520 between the TEE 516 and the AP 518 for secure transmissions between the TEE 516 and the AP 518.

The TEE 516 can receive the unique encryption key from the digital interface 508 and store the unique encryption key within a memory 522 of the TEE 516. The TEE 516 further receives the encrypted digital image from the digital interface 508 and utilizes the unique encryption key to decrypt the encrypted digital image to produce a digital image. The TEE 516 may compare the digital image with a control image to determine whether the control image and the digital image substantially match. The TEE 516 may generate an indication of whether the control image and the digital image substantially match. The TEE 516 may provide the indication to the AP 518 and the AP 518 may determine whether to grant access to the device, the secured information, and/or the secured applications based on the indication. In particular, the AP 518 may grant access to the device, the secured information, and/or the secured applications in response to determining that the indication indicates the control image and the digital image substantially match. The AP 518 may prevent access to the device, the secured information, and/or the secured applications in response to determining that the indication indicates the control image and the digital image do not substantially match.

Hashing Approach

In some embodiments, a hash function could be used to irreversibly scramble the fingerprint data. Similar to the encryption method, the hash function could be based on a random code generated by a PUF. During the training sequence when a new user is registered to the system, the fingerprint would be hashed and the hashed fingerprint may be stored as a control image. The TEE may only have access to the hashed image. During user authentication the same hashed image can be used. The TEE can compare a captured, hashed authentication image to the control image. If the functions are properly designed to retain sufficient information, the authentication could be performed without any access to the unencrypted fingerprint. Similar to the encryption approach, an attacker that listens to the ROIC-TEE interface can only obtain a scrambled image. This image would be useless since each device would have a unique hash function. Unlike the encryption approach, there would be no way to access the original image, even if the security of the TEE were compromised.

A system using this approach may include a matching engine compatible with hashed images.

Figure 6:
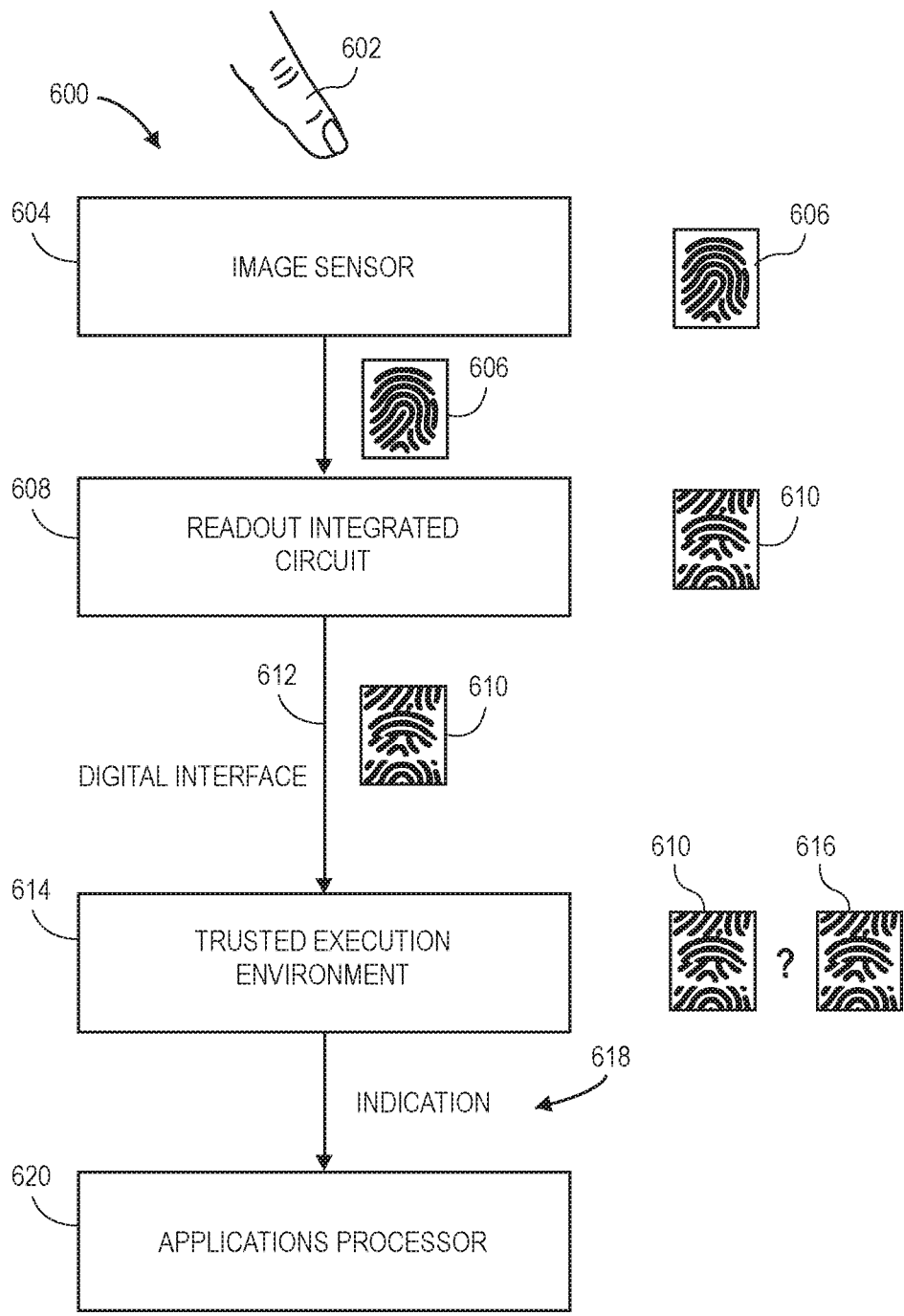
FIG. 6 illustrates an example data flow for an example fingerprint authentication system according to various embodiments.

FIG. 6 illustrates an example data flow for an example fingerprint authentication system 600 according to various embodiments. The fingerprint authentication system 600 may include one or more of the features of the fingerprint authentication system 100 (FIG. 1). For example, the components of the fingerprint authentication system 600 may include one or more of the features of the corresponding components of the fingerprint authentication system 100. The fingerprint authentication system 600 implements an example hashing approach in accordance with some embodiments disclosed herein.

A finger 602 of a user may be placed on a portion of an image sensor 604 of the fingerprint authentication system 600 to initiate fingerprint authorization procedure. For example, the finger 602 may be placed on a display of the image sensor 604, where the display emits light and detects light reflected back by the finger. Based on the light reflected back by the finger, the image sensor 604 generates an analog image 606 of a fingerprint of the finger. The image sensor 604 outputs the analog image 606 to a ROIC 608 of the fingerprint authentication system 600.

The ROIC 608 receives the analog image 606 of the fingerprint from the image sensor 604 and converts the analog image 606 to a digital image. Further, the ROIC 608 performs a hash operation on the digital image to produce a hashed digital image 610. The ROIC 608 utilizes a unique hash function to perform the hash operation on the digital image, where the unique hash function is unique to the device that implements the fingerprint authentication system 600. The ROIC 608 may include a hash function generator that generates the unique hash function. The hash function generator may utilize a PUF to generate the unique hash function. The ROIC 608 may provide the hashed digital image 610 to a digital interface 612 of the fingerprint authentication system 600.

A TEE 614 of the fingerprint authentication system 600 receives the hashed digital image 610 from the digital interface 612. The TEE 614 may compare the hashed digital image 610 with a control image 616 of a fingerprint for an authorized user. The control image 616 may comprise a hashed image of the fingerprint for the authorized user, where the control image may have been previously captured and hashed by the ROIC 608 based on the unique hash function. The TEE 614 may not have access to the unique hash function in the illustrated embodiment. Based on the comparison, the TEE 614 may determine whether the digital image 610 substantially matches (i.e., either exactly matches or matches within a predefined difference measurement range) the control image 616. The TEE 614 may output an indication 618 (such as binary values or analog values) of whether the digital image 610 substantially matches the control image 616.

An AP 620 of the fingerprint authentication system 600 may receive the indication 618. Based on the indication 618, the AP 620 may grant or prevent access to the device, secured information, and/or secured applications. In particular, the AP 620 may grant access to the device, secured information, and/or secured applications in response to determining that the indication 618 indicates that the digital image 610 and the control image 616 substantially match. The AP 620 may prevent access to the device, secured information, and/or secured applications in response to determining that the indication 618 indicates that the digital image 610 and the control image 616 do not substantially match.

Figure 7:
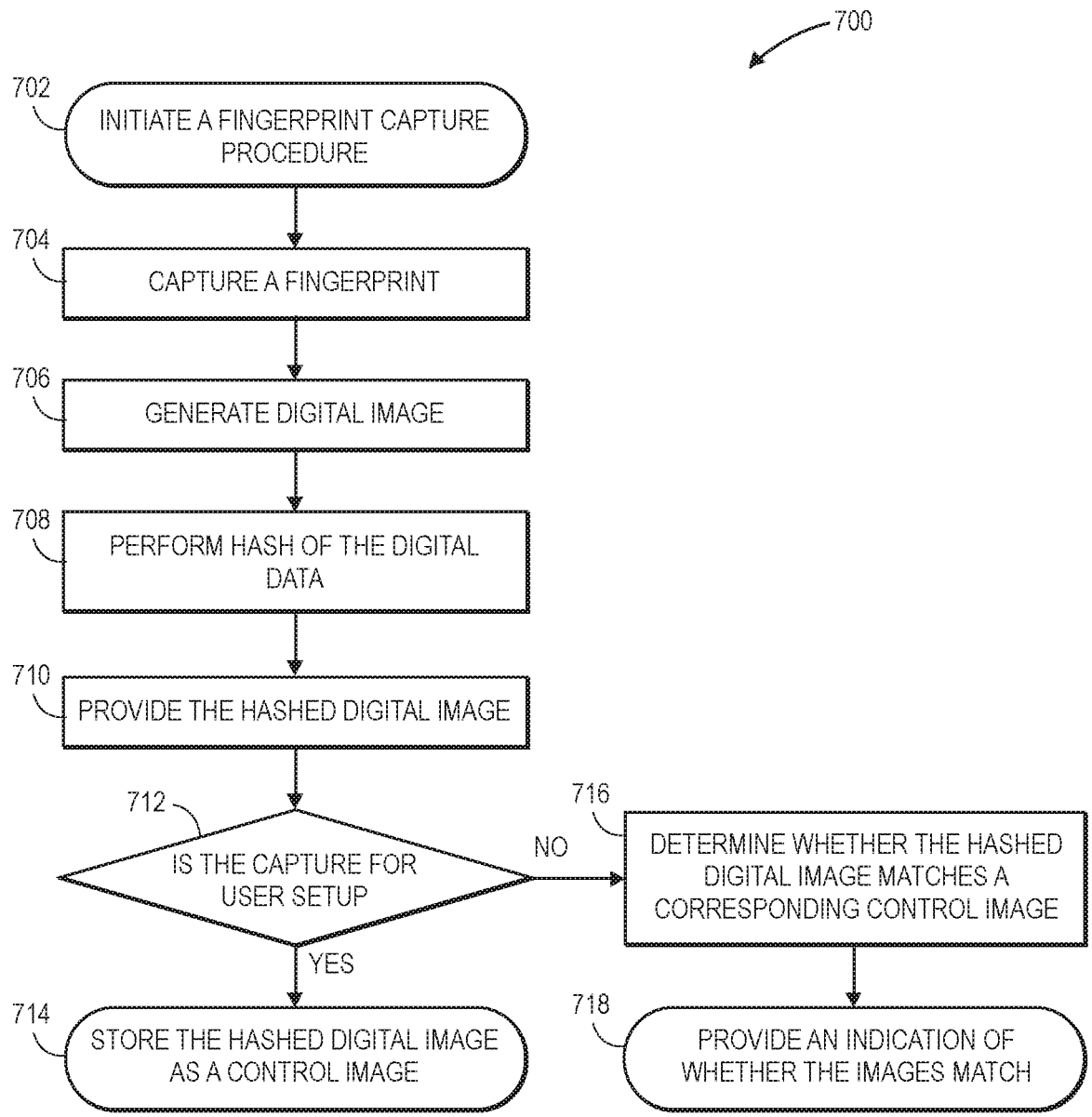
FIG. 7 illustrates an example procedure of fingerprint capture to be implemented by a fingerprint authentication system according to various embodiments.

FIG. 7 illustrates an example procedure 700 of fingerprint capture to be implemented by a fingerprint authentication system (such as the fingerprint authentication system 600 (FIG. 6)) according to various embodiments. The procedure 700 can be utilized for user authentication via a fingerprint or generation of a control image depending if the procedure 700 is being performed as part of a user setup.

The procedure 700 initiates with 702, where a fingerprint capture procedure is initiated. A user placing a finger on an image sensor (such as the image sensor 604 (FIG. 6)) may cause 702 to be initiated. The procedure 700 may proceed from 702 to 704.

In 704, a fingerprint of the finger is captured. In particular, the image sensor may direct light at the finger and detect light reflected back from the finger. Based on the light reflected back, the image sensor may generate an analog image of the fingerprint. The procedure 700 may proceed from 704 to 406.

In 706, a digital image of the fingerprint is generated from the analog image. In particular, an ROIC (such as the ROIC 608 (FIG. 6)) of the fingerprint authentication system may receive the analog image. The ROIC may convert the received analog image to the digital image. The procedure 700 may proceed from 706 to 708.

In 708, a hash operation is performed on the digital image to produce a hashed digital image. In particular, the ROIC may utilize a unique hash function to perform the hash operation on the digital image and produce the hashed digital image. The unique hash function may have been generated by a hash function generator of the ROIC. The ROIC may utilize a PUF to generate the unique hash function. Once generated, the ROIC may store the unique hash function and utilize the unique hash function for performing hash operations. The procedure 700 may proceed from 708 to 710.

In 710, the ROIC provides the hashed digital image to a TEE (such as the TEE 614 (FIG. 2)) of the fingerprint authentication system. In particular, the ROIC may provide the hashed digital image to a digital interface between the ROIC and the TEE. The TEE may receive the hashed digital image from the digital interface. The procedure 700 may proceed from 710 to 712.

In 712, the procedure 700 may proceed differently dependent on whether the fingerprint capture procedure is being performed as part of a user setup. In some embodiments, the TEE may determine whether the fingerprint capture procedure is being performed as part of a user setup and may determine how to proceed based on whether the fingerprint capture procedure is being performed as part of a user setup. If the fingerprint capture procedure is being performed as part of a user setup, the procedure 700 proceeds to 714. If the fingerprint capture procedure is not being performed as part of a user setup, the procedure 700 proceeds to 718.

In 714, the hashed digital image is stored as a control image for the user that is subject of the user setup. The control image may be stored by the TEE and the TEE may utilize the control image for subsequent authentications of the user. The procedure 700 may conclude with 714 when user setup is being performed.

In 716, whether the hashed digital image substantially matches (i.e., either exactly match or match within a predefined difference measurement range) a corresponding control image may be determined. In particular, the hashed digital image may be compared with a control image of a fingerprint for a user for which authentication is being performed. The TEE may perform the comparison and determine whether the hashed digital image substantially matches the control image. The procedure 700 may proceed from 716 to 718.

In 718, an indication of whether the hashed digital image and the control images substantially match may be provided. In particular, the TEE may generate an indication indicating whether the digital image and the control image substantially match. The TEE may provide the indication to an AP (such as the AP 620 (FIG. 6)) of the fingerprint authentication system. The AP may utilize the indication to determine whether access should be provided to the device, secured information, and/or secured applications.

Figure 8:
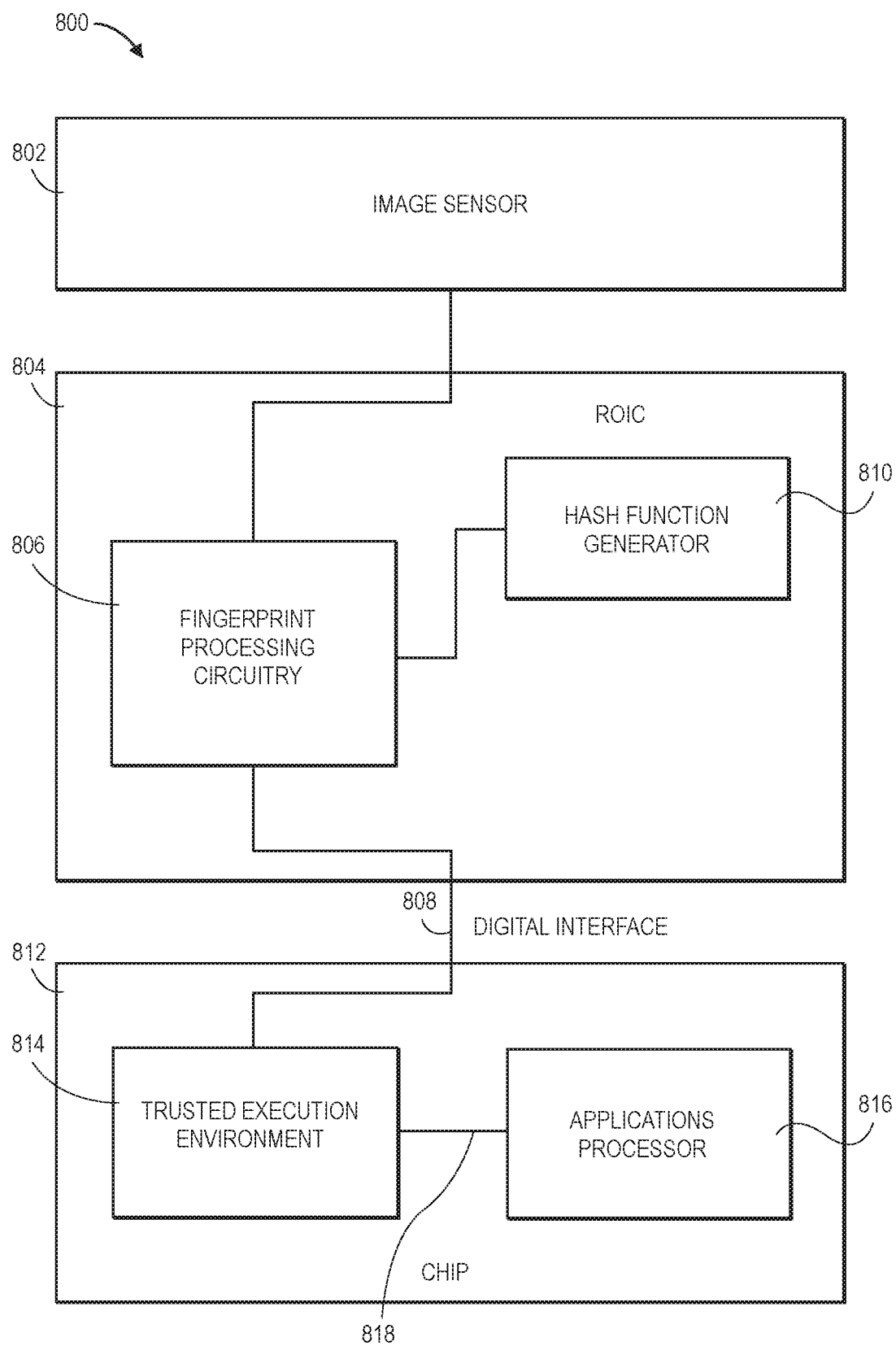
FIG. 8 illustrates a block diagram of fingerprint authentication system according to various embodiments.

FIG. 8 illustrates a block diagram of fingerprint authentication system 800 according to various embodiments. The fingerprint authentication system 800 may include one or more of the features of the fingerprint authentication system 100 (FIG. 1) and/or the fingerprint authentication system 600 (FIG. 6). The fingerprint authentication system 800 may implement the procedure 700 (FIG. 7).

The fingerprint authentication system 800 includes an image sensor 802. The image sensor 802 may include one or more of the features of the image sensor 102 (FIG. 1) and/or the image sensor 604 (FIG. 6). The image sensor 802 may capture an image of a fingerprint of a finger placed on a portion (such as a display) of the image sensor 802 and may generate an analog image of the fingerprint.

The fingerprint authentication system 800 further includes an ROIC 804 coupled to the image sensor 802. The ROIC 804 may receive the analog image from the image sensor 802, convert the analog image to a digital image, and perform a hash operation on the digital image to produce a hashed digital image. Further, the ROIC 804 may generate a unique hash function.

The ROIC 804 includes fingerprint processing circuitry 806. The fingerprint processing circuitry 806 may receive the analog image from the image sensor 802. The fingerprint processing circuitry 806 may convert the analog image to a digital image, and may perform a hash operation on the digital image. The fingerprint processing circuitry 806 may perform the hash operation on the digital image using a unique hash function, where the unique hash function is unique to a device implementing the fingerprint authentication system 800. The fingerprint processing circuitry 806 may provide the hashed digital image to a digital interface 808 of the fingerprint authentication system 800.

The ROIC 804 further includes a hash function generator 810. The hash function generator 810 may generate the unique hash function utilized by the fingerprint processing circuitry 806 for performing the hash operation on the digital image. In some embodiments, the hash function generator 810 may implement a PUF to generate the unique hash function. The hash function generator 810 may provide the unique hash function to the fingerprint processing circuitry 806 for performing the hash operation on the digital image.

The fingerprint authentication system 800 may further include a chip 812. The chip 812 may include a TEE 814 and an AP 816. The chip 812 may provide physical separation and/or a firewall between the TEE 814 and the AP 816 for security between the TEE 814 and the AP 816. The chip 812 may further provide a secure interface 818 between the TEE 814 and the AP 816 for secure transmissions between the TEE 814 and the AP 816.

The TEE 814 receives the hashed digital image from the digital interface 808. The TEE 814 may compare the hashed digital image with a control image to determine whether the control image and the hashed digital image substantially match. The TEE 814 may generate an indication of whether the control image and the hashed digital image substantially match. The TEE 814 may provide the indication to the AP 816 and the AP 816 may determine whether to grant access to the device, the secured information, and/or the secured applications based on the indication. In particular, the AP 816 may grant access to the device, the secured information, and/or the secured applications in response to determining that the indication indicates the control image and the hashed digital image substantially match. The AP 816 may prevent access to the device, the secured information, and/or the secured applications in response to determining that the indication indicates the control image and the digital image do not substantially match.

EXAMPLE IMPLEMENTATIONS

The following examples are provided by way of illustration.

Example 1 may include a device that is to implement fingerprint authentication, comprising an image sensor to capture an image of a fingerprint of a user for the fingerprint authentication, and a readout integrated circuit (ROIC) coupled to the image sensor, the ROIC to utilize an encryption key or a hash function to perform encryption or hashing of the image, wherein the encryption key or the hash function is unique to the device.

Example 2 may include the device of example 1, wherein the ROIC is to utilize the encryption key to perform encryption of the image.

Example 3 may include the device of example 2, wherein a physically uncloneable function is to produce the encryption key.

Example 4 may include the device of example 2, wherein the ROIC is to transmit the encryption key via an interface to a trusted execution environment, wherein the ROIC is to cause an irreversible procedure to be performed in response to transmission of the encryption key via the interface, and wherein the irreversible procedure prevents the ROIC from subsequent transmission of the encryption key via the interface.

Example 5 may include the device of example 4, further comprising a fuse, wherein the irreversible procedure is to cause the fuse to be blown, and wherein the fuse being blown decouples the ROIC from the interface.

Example 6 may include the device of example 1, wherein the ROIC is to utilize the hash function to perform hashing of the image.

Example 7 may include the device of example 6, wherein a physically uncloneable function (PUF) is to produce the hash function.

Example 8 may include the device of example 7, wherein the PUF is to be used to generate a random code, and wherein the hash function is based on the random code.

Example 9 may include the device of example 6, wherein the hashing of the image via the ROIC is to produce a hashed image of the fingerprint, wherein the ROIC is to provide the hashed image to a trusted execution environment (TEE), and wherein the TEE is to utilize the hashed image as a control image for authentication of subsequent hashed images of fingerprints provided by the ROIC.

Example 10 may include the device of example 9, wherein the hashed image is a first hashed image, wherein the fingerprint is a first fingerprint, wherein the ROIC is to produce a second hashed image of a second fingerprint captured by the image sensor, and provide the second hashed image to the TEE, and the TEE is to compare the second hashed image with the control image to determine whether to grant access to the device, secured information, or secured information based on the comparison of the second hashed image with the control image.

Example 11 may include one or more computer-readable media having instructions stored thereon, wherein the instructions, when executed by a device, cause the device to capture an image of a fingerprint, encrypt or hash the image to produce an encrypted image or a hashed image, wherein an encryption key or a hash function utilized to encrypt or hash the image is unique to the device, and provide the encrypted image or the hashed image for fingerprint authentication.

Example 12 may include the one or more computer-readable media of example 11, wherein the encryption key or the hash function is generated based on a physically uncloneable function.

Example 13 may include the one or more computer-readable media of example 11, wherein to encrypt or hash the image comprises to encrypt the image, wherein the encryption key is to be utilized to encrypt the image, and wherein the instructions, when executed by the device, further cause the device to provide the encryption key via an interface to a trusted execution environment (TEE), and cause a fuse of the device to be blown subsequent to the encryption key being provided to the TEE to prevent the encryption key from being provided to the TEE at a subsequent time.

Example 14 may include the one or more computer-readable media of example 13, wherein the encryption key is to be provided to the TEE during factory setup, and wherein the fuse is to be blown during the factory setup.

Example 15 may include the one or more computer-readable media of example 11, wherein to encrypt or hash the image comprises to hash the image, wherein the hash function is to be utilized to hash the image, and wherein to provide the hashed image for fingerprint authentication includes to provide the hashed image to a trusted execution environment (TEE) to be utilized as a control image by the TEE for fingerprint authentication of subsequent hashed images provided to the TEE.

Example 16 may include the one or more computer-readable media of example 15, wherein the hashed image comprises a first hashed image, wherein the fingerprint is a first fingerprint, and wherein the instructions, when executed by the device, further cause the device to capture an image of a second fingerprint, hash the image of the second fingerprint with the hash function to produce a second hashed image, and provide the second hashed image to the TEE, the TEE to utilize the control image to perform fingerprint authentication of the second hashed image.

Example 17 may include a device for fingerprint authentication, comprising a trusted execution environment (TEE) to determine a result of the fingerprint authentication, and a readout integrated circuit (ROIC) to generate an encryption key or a hash function, the encryption key or the hash function being unique to the device, and provide the encryption key or a hashed image of a fingerprint produced by the hash function to the TEE via an interface, the encryption key or the hashed image to be utilized for the fingerprint authentication.

Example 18 may include the device of example 17, wherein to generate the encryption key or the hash function comprises to generate the encryption key, wherein to provide the encryption key or the hashed image to the TEE comprises to provide the encryption key to the TEE, and wherein the TEE is further to receive an encrypted image of a first fingerprint from the ROIC, decrypt the encrypted image of the finger fingerprint with the encryption key to produce a control image to be utilized for the fingerprint authentication, and generate, based on a comparison of the control image with an encrypted image of a second fingerprint received from the ROIC, an indication of whether to provide access to the device, secured information, or a secured application.

Example 19 may include the device of example 17, wherein to generate the encryption key or the hash function comprises to generate the hash function, wherein the hashed image of the fingerprint is a hashed image of a first fingerprint, wherein the ROIC is further to perform a first hash operation on an image of a first fingerprint to produce the hashed image of the first fingerprint, perform a second hash operation on an image of a second fingerprint to produce a hashed image of the second fingerprint, and provide the hashed image of the second fingerprint to the TEE, and the TEE is further to store the hashed image of the first fingerprint as a control image for the fingerprint authentication, and generated, based on a comparison of the control image with the hashed image of the second fingerprint, an indication of whether to provide access to the device, secured information, or a secured application.

Example 20 may include the device of example 17, wherein to generate the encryption key or the hash function comprises to generate the encryption key or the hash function based on a physically uncloneable function.

The foregoing outlines features of one or more embodiments of the subject matter disclosed herein. These embodiments are provided to enable a person having ordinary skill in the art (PHOSITA) to better understand various aspects of the present disclosure. Certain well-understood terms, as well as underlying technologies and/or standards may be referenced without being described in detail. It is anticipated that the PHOSITA will possess or have access to background knowledge or information in those technologies and standards sufficient to practice the teachings of the present disclosure.

The PHOSITA will appreciate that they may readily use the present disclosure as a basis for designing or modifying other processes, structures, or variations for carrying out the same purposes and/or achieving the same advantages of the embodiments introduced herein. The PHOSITA will also recognize that such equivalent constructions do not depart from the spirit and scope of the present disclosure, and that they may make various changes, substitutions, and alterations herein without departing from the spirit and scope of the present disclosure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SoC) central processing unit (CPU) package. An SoC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. Any module, function, or block element of an ASIC or SoC can be provided, where appropriate, in a reusable "black box" intellectual property (IP) block, which can be distributed separately without disclosing the logical details of the IP block. In various other embodiments, the digital signal processing functionalities may be implemented in one or more silicon cores in application-specific integrated circuits (ASICs), field-programmable gate arrays (FPGAs), and other semiconductor chips.

In some cases, the teachings of the present disclosure may be encoded into one or more tangible, non-transitory computer-readable mediums having stored thereon executable instructions that, when executed, instruct a programmable device (such as a processor or DSP) to perform the methods or functions disclosed herein. In cases where the teachings herein are embodied at least partly in a hardware device (such as an ASIC, IP block, or SoC), a non-transitory medium could include a hardware device hardware-programmed with logic to perform the methods or functions disclosed herein. The teachings could also be practiced in the form of Register Transfer Level (RTL) or other hardware description language such as VHDL or Verilog, which can be used to program a fabrication process to produce the hardware elements disclosed.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

Additionally, some of the components associated with described microprocessors may be removed, or otherwise consolidated. In a general sense, the arrangements depicted in the figures may be more logical in their representations, whereas a physical architecture may include various permutations, combinations, and/or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, equipment options, etc.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, an FPGA, an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), FPGA, EPROM, electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory.' Similarly, any of the potential processing elements, modules, and machines described herein should be construed as being encompassed within the broad term 'microprocessor' or 'processor.' Furthermore, in various embodiments, the processors, memories, network cards, buses, storage devices, related peripherals, and other hardware elements described herein may be realized by a processor, memory, and other related devices configured by software or firmware to emulate or virtualize the functions of those hardware elements.

Computer program logic implementing all or part of the functionality described herein is embodied in various forms, including, but in no way limited to, a source code form, a computer executable form, a hardware description form, and various intermediate forms (for example, mask works, or forms generated by an assembler, compiler, linker, or locator). In an example, source code includes a series of computer program instructions implemented in various programming languages, such as an object code, an assembly language, or a high-level language such as OpenCL, RTL, Verilog, VHDL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

In the discussions of the embodiments above, the capacitors, buffers, graphics elements, interconnect boards, clocks, DDRs, camera sensors, converters, inductors, resistors, amplifiers, switches, digital core, transistors, and/or other components can readily be replaced, substituted, or otherwise modified in order to accommodate particular circuitry needs. Moreover, it should be noted that the use of complementary electronic devices, hardware, non-transitory software, etc. offer an equally viable option for implementing the teachings of the present disclosure.

In one example embodiment, any number of electrical circuits of the FIGURES may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In another example embodiment, the electrical circuits of the FIGURES may be implemented as standalone modules (e.g., a device with associated components and circuitry configured to perform a specific application or function) or implemented as plug-in modules into application-specific hardware of electronic devices.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this disclosure. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

What is claimed is:

1. A device that is to implement fingerprint authentication, comprising:
   an image sensor to capture an image of a fingerprint of a user for the fingerprint authentication; and
   a readout integrated circuit (ROIC) coupled to the image sensor, the ROIC to utilize an encryption key to perform encryption of the image, wherein the encryption key is unique to the device, the ROIC is to transmit the encryption key via an interface to a trusted execution environment, and the ROIC is to cause an irreversible procedure to be performed in response to transmission of the encryption key via the interface, and
   wherein the irreversible procedure prevents the ROIC from subsequent transmission of the encryption key via the interface.

2. The device of claim 1, wherein a physically uncloneable function is to produce the encryption key.

3. The device of claim 1, further comprising a fuse, wherein the irreversible procedure is to cause the fuse to be blown, and wherein the fuse being blown decouples the ROIC from the interface.

4. One or more non-transitory computer-readable media having instructions stored thereon, wherein the instructions, when executed by a device, cause the device to:
   capture an image of a fingerprint;
   encrypt the image to produce an encrypted image, wherein an encryption key utilized to encrypt the image is unique to the device,
   provide the encrypted image for fingerprint authentication,
   provide the encryption key via an interface to a trusted execution environment (TEE); and
   cause a fuse of the device to be blown subsequent to the encryption key being provided to the TEE to prevent the encryption key from being provided to the TEE at a subsequent time.

5. The one or more non-transitory computer-readable media of claim 4, wherein the encryption key is generated based on a physically uncloneable function.

6. The one or more non-transitory computer-readable media of claim 4, wherein the encryption key is to be provided to the TEE during factory setup, and wherein the fuse is to be blown during the factory setup.

7. A device for fingerprint authentication, comprising:
   a trusted execution environment (TEE) to determine a result of the fingerprint authentication; and
   a readout integrated circuit (ROTC) to:
      generate an encryption key unique to the device;
      provide the encryption key to the TEE via an interface, the encryption key to be utilized for the fingerprint authentication;
      utilize the encryption key to perform encryption of the image; and
      cause an irreversible procedure to be performed in response to transmission of the encryption key via the interface, and
   wherein the irreversible procedure prevents the ROIC from subsequent transmission of the encryption key via the interface.

8. The device of claim 7, wherein the TEE is further to:
   receive an encrypted image of a first fingerprint from the ROIC;
   decrypt the encrypted image of the first fingerprint with the encryption key to produce a control image to be utilized for the fingerprint authentication; and
   generate, based on a comparison of the control image with an encrypted image of a second fingerprint received from the ROIC, an indication of whether to provide access to the device, secured information, or a secured application.

9. The device of claim 7, wherein to generate the encryption key comprises to generate the encryption key based on a physically uncloneable function.

* * * * *